(12) United States Patent
Wright

(10) Patent No.: US 7,571,535 B2
(45) Date of Patent: Aug. 11, 2009

(54) METHOD OF FABRICATING A SUSPENSION LOAD BEAM WITH A COMPOSITE DAMPING CORE

(75) Inventor: John S. Wright, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/787,285

(22) Filed: Apr. 16, 2007

(65) Prior Publication Data

US 2007/0195462 A1    Aug. 23, 2007

Related U.S. Application Data

(62) Division of application No. 10/610,788, filed on Jun. 30, 2003, now Pat. No. 7,224,554.

(51) Int. Cl.
*G11B 5/127* (2006.01)
*H04R 31/00* (2006.01)

(52) U.S. Cl. .............. 29/603.03; 29/603.04; 29/603.06; 216/36; 216/65; 360/240; 360/244; 360/244.8; 360/245.2; 360/245.4; 427/127; 427/128; 451/5; 451/41

(58) Field of Classification Search ............... 29/603.03, 29/603.04, 603.06; 360/294.4–294.7, 245.2, 360/245.4; 216/39, 65
See application file for complete search history.

(56) References Cited

U.S. PATENT DOCUMENTS

| | | | |
|---|---|---|---|
| 4,425,393 A | 1/1984 | Benedyk et al. | |
| 4,543,295 A | 9/1985 | St. Clair et al. | |
| 4,760,478 A | 7/1988 | Pal et al. | |
| 4,991,045 A | 2/1991 | Oberg | |
| 4,996,623 A | 2/1991 | Erpelding et al. | |
| 5,065,268 A | 11/1991 | Hagen | |
| 5,187,625 A | 2/1993 | Blaeser et al. | |
| 5,368,916 A | 11/1994 | Fujimoto et al. | |
| 5,408,372 A | 4/1995 | Karam, II | |
| 5,471,734 A | 12/1995 | Hatch et al. | |
| 5,594,607 A | 1/1997 | Erpelding et al. | |
| 5,657,187 A | 8/1997 | Hatch et al. | |
| 5,839,193 A | 11/1998 | Bennin et al. | |
| 5,940,251 A * | 8/1999 | Giere et al. ............... | 360/244.9 |
| 5,943,191 A * | 8/1999 | Giere et al. ............... | 360/244.9 |
| 5,965,249 A | 10/1999 | Sutton et al. | |
| 5,978,178 A | 11/1999 | Adley | |
| 6,046,887 A | 4/2000 | Uozumi et al. | |
| 6,091,578 A | 7/2000 | Stole et al. | |

(Continued)

*Primary Examiner*—Paul D Kim
(74) *Attorney, Agent, or Firm*—Kinney & Lange, P.A.

(57) ABSTRACT

A suspension load beam used for attachment to a slider assembly and an actuation arm in a disc drive for data storage has a rigid middle beam section comprising a rigid bottom layer, a rigid top layer and a composite core layer sandwiched between the bottom layer and the top layer. A method for fabricating a vibration resistant mechanical member used a disc drive subject to high frequency motion operations is also disclosed. The method involves making an integral laminate structure and fabricating the mechanical member from the integral laminate structure. The integral laminate structure has a rigid bottom layer, a composite core layer on top of the rigid bottom layer, and a rigid top layer on top of the core layer so that the composite core layer is sandwiched between the rigid bottom layer and the rigid top layer.

14 Claims, 4 Drawing Sheets

U.S. PATENT DOCUMENTS

| | | |
|---|---|---|
| 6,128,880 A | 10/2000 | Meenan, Jr. |
| 6,157,522 A | 12/2000 | Murphy et al. |
| 6,388,789 B1 | 5/2002 | Bernstein |
| 6,392,843 B1 | 5/2002 | Murphy |
| 6,424,498 B1 | 7/2002 | Patterson et al. |
| 6,512,654 B2 | 1/2003 | Teshima |
| 6,585,902 B1 | 7/2003 | Shum et al. |
| 6,594,114 B1 | 7/2003 | Suzuki et al. |
| 6,700,745 B2 | 3/2004 | Shiraishi |
| 6,731,466 B2 | 5/2004 | Arya |
| 6,780,908 B1 | 8/2004 | Huynh-Ba |
| 6,785,094 B2 | 8/2004 | Arya et al. |
| 6,887,577 B1 | 5/2005 | Keller et al. |

\* cited by examiner

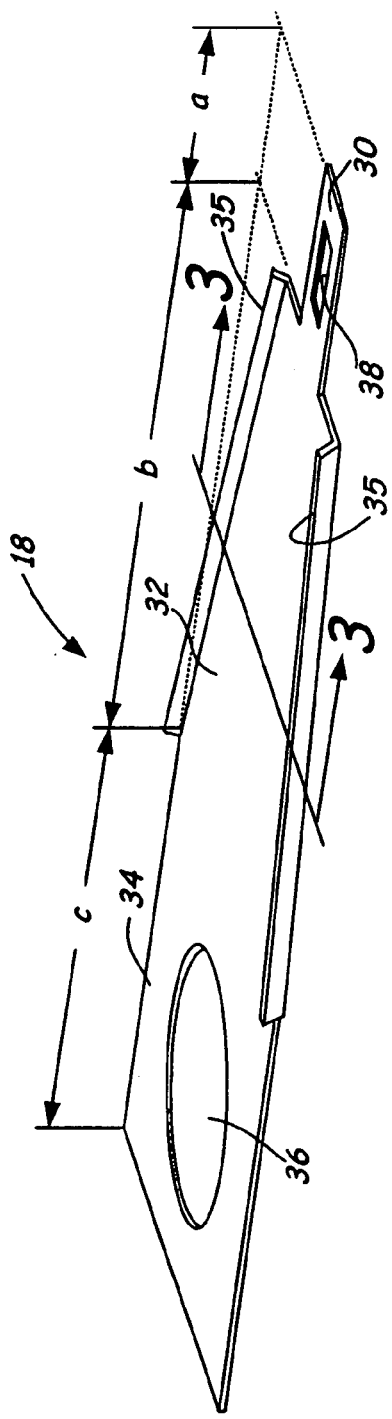

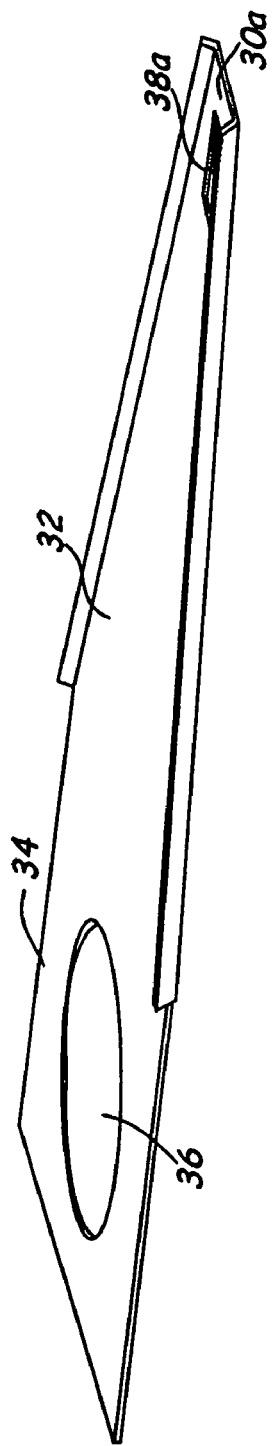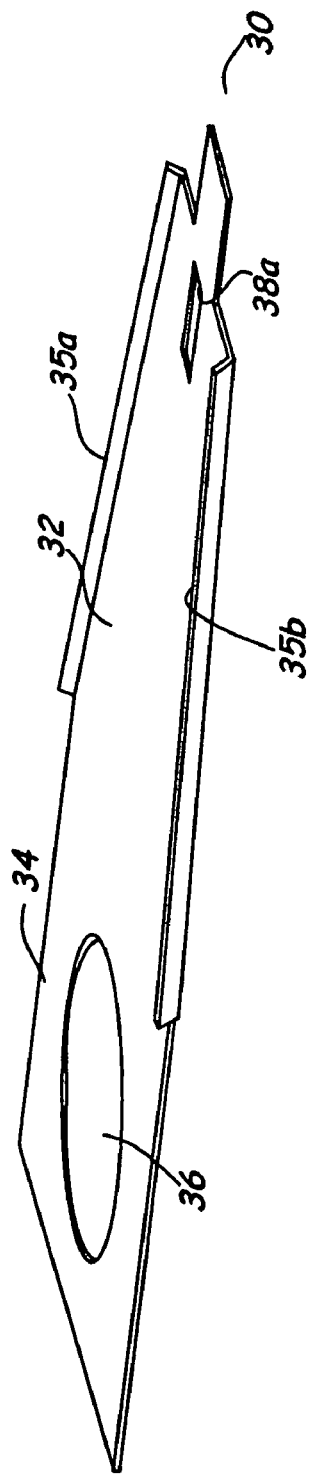

METHOD OF FABRICATING A SUSPENSION LOAD BEAM WITH A COMPOSITE DAMPING CORE

CROSS-REFERENCE TO RELATED APPLICATION(S)

This application is a division of application Ser. No. 10/610,788 filed Jun. 30, 2003.

BACKGROUND

The present invention relates to a suspension load beam in a disc drive, such as a hard drive using a magnetic storage medium. More particularly, the present invention relates to a disc drive suspension load beam using a damping material to reduce high frequency vibration.

Disc drives are one of the key components to store data in a computer system. In a basic hard disc drive, data is stored in a magnetic medium formed on a surface of a rotating disc. The hard disc drive reads and writes information stored on tracks on a disc bearing the magnetic medium. To do this, a read/write head that includes a transducer carried by a slider assembly is placed in close proximity to the surface of the magnetic medium. The slider is attached through a gimbal system to a distal end of a suspension load beam. The proximal end of the suspension load beam is attached to an actuator arm which is rotatably controlled by a voice coil motor (VCM). The disc drive system sends control signals to the voice coil motor to move the actuator arm and the suspension supporting the read/write head across the disc in a radial direction to the target track. The positioning of the read/write head over the magnetic medium is controlled by a closed loop circuit for better accuracy. In addition to the active controlling signal from the closed loop circuit, the precise positioning of the read/write head is affected by a dynamic balance between two vertical forces. The first force is a gram load applied by the suspension load beam to bias the head toward the disc surface. The second force is an air bearing lifting force caused by the fast motion between the slider and the disc surface. Roughly, the looped control system controls tracking (i.e., radial positioning of the head) while the dynamic balance determines fly-height (i.e., head-media spacing). However, as the areal density of concentric data tracks on magnetic discs continues to increase (that is, the size of data tracks and radial spacing between data tracks decrease), hard disc systems also use active control for more precise vertical positioning of the head.

One of the most significant adversarial conditions affecting precise positioning of the read/write head in a disc drive system is vibration, particularly that caused by head suspension resonance. Many types of vibration exist in a disc drive system to cause fluctuation of the magnetic read/write head positioning. However, vibrations that occur at frequencies far away from a resonant mode (e.g., less than one third of the first resonant mode) are usually less serious concerns. In contrast, vibrations that cause resonance of the system are often much more serious obstacles in improving areal density and rotation speed of the disc drive system. Every closed loop servomotor system has a predetermined bandwidth in which resonances occurring within the bandwidth degrade the performance of the servomotor system. In a hard disc drive system, for example, windage (fluid turbulence caused by airflow) and head vibration occur at a frequency close to a resonant mode of the suspension load beam and thus cause the suspension head assembly to resonate at large amplitudes. Windage and head vibration, however, are not the only sources that cause resonance in a hard disc drive system. In today's high-speed hard disc drives, the servomotor that moves the parts at high frequency may also cause resonance. In addition, when it is desired to position the magnetic head at a specific track location, the voice coil motor is driven by a voltage that has a very short rise time to accelerate the actuator very quickly. Once the actuator is in motion, the voltage levels off and the actuator approaches a constant velocity. As the actuator approaches the target location on the disc, a similar, but inverse abrupt voltage pattern is applied to the voice coil motor to stop the suspension actuator. This sequence of voltage change is best represented by a square wave, which is a superposition of many waves of different frequencies, according to Fourier transform. The operation of the servo system in a hard disc drive to move the suspension head assembly thus has inherent frequency components that may excite resonance.

Resonance degrades the performance of a disc drive in several ways. First, severe resonance, especially that of torsion or sway mode, may cause the magnetic read/write head to move away from the target track and thus result in data reading/writing error. Second, resonance in the vertical direction, such as that caused by resonance in bending mode, may cause fluctuations in the fly height of the read/write head to result in data error as well. In extreme cases, vertical fluctuations may even cause catastrophic damage of the disc drive due to direct contact between the head and the disc surface. Third, during resonance, the transducer element of the read/write head is forced to modulate, causing a significant decrease in the signal to noise ratio of the system and increase of the non-repeatable run-out (NRRO).

Significant efforts have been made to alleviate the problem of resonance. Various methods have been used. Optimization of the system is essentially a balance of several factors, often gaining on one aspect at a cost of sacrificing another, as commonly found for a spring-mass-damper system. A suspension load beam must be sufficiently stiff in order to be mechanically and structurally stable. Unstable materials suffer change of physical dimension with time, so-called cold flow or creep. To maintain a sufficient stiffness of the suspension load beam, a stiff metal piece, such as stainless steel sheet material, is used to make at least part of the suspension load beam. In principle, stainless steel part of the load beams could be made thicker to increase the bending and torsion mode frequencies, but the greater mass significantly degrades the performance of the actuator assembly by increasing the inertia of the arm. An increased inertia will decrease the access time to position between data tracks and increase the current requirements necessary to move the voice coil motor and the suspension head assembly. These changes then cause other problems such as increased heat within the disc enclosure and increased power requirements. A thicker steel arm will also result in a higher mass assembly that will cause significant degradation of shock resistance of the disc drive system. Higher mass also leads to lower stability. Although materials having higher stiffness/mass ratio than that of stainless steel do exist and have been experimented, solutions of this type have not become widely acceptable mainly due to high cost and low reliability issues. Other methods for increasing the stiffness of the suspension load beam without increasing the mass or switching to a more expensive material are also suggested. U.S. Pat. No. 5,408,372 to Karam, for example, uses a micro-stiffening technique to control resonance in the suspension system of a disc drive.

Another approach to reduce resonance of the suspension head system in a disc drive is to use dampers. U.S. Pat. No. 3,725,884 to Garfien shows a support arm on which the magnetic head is supported by a spring member and up and down motion of the magnetic head is damped by an additional leaf spring in rubbing contact with friction pads. U.S. Pat. No. 4,760,478 to Pal et al. uses a layer of damping material fixed to the top of the elongated flat load beam and a constraining member fixed in contact with the damping material to reduce the resonance. U.S. Pat. No. 6,297,933 to Khan et al. discloses a disc drive suspension load beam having a damping structure containing an organic damping material. The damping structure is attached in a load beam recess sized and shaped to limit exposure of organic damping material to the ambient atmosphere.

Dampers commonly used are damping structures attached to the suspension load beam. Dampers are believed to absorb vibration energy when repetitive deformation (caused by vibration) of a material is dissipated through internal energy losses, usually in the form of heat. One form of internal energy dissipation is through shear energy absorption in the layer of damping material. It has been known that materials that exhibit a large ratio of dynamic loss moduli to dynamic storage moduli, tan δ, tend to have high shear energy absorption and thus are good candidates for making dampers. An exemplary type of materials exhibit a large tan δ is viscoelastic materials, which when deformed, have a stress proportional to both the deformation and the rate of deformation. Viscoelastic materials also exhibit creep and relaxation behavior. Creep means that under constant stress the deformation increases in time. Relaxation means that under constant fixed deformation the stress decreases steadily in time. These properties generally relate closely to damping properties because they are opposite to that of a spring material which is known to preserve dynamic energy during motions without converting the energy into thermal energy.

A number of approaches have been taken to achieve material properties sufficient for damping purposes. Specialized formulations of cross-linking polymers have been developed which exhibit damping in specific applications. Epoxy formulations have been developed for damping vibrations in magnetic read/write heads, as disclosed in U.S. Pat. No. 5,270,888. Acrylic copolymers for damping are commercially available in, for example, sheeting form. Silicone chemistries have been developed for damping, as disclosed in U.S. Pat. No. 5,434,214 to Sutton et al. In addition, a composite damping material is suggested in U.S. Pat. No. 5,965,249, in which a highly viscous damping fluid is entrapped within the pores of a porous material (such as an expanded polymer, felt material, foam, fabric, metal, etc.). The patent further suggests attaching a piece of the composite damping material to a surface of a mechanical member in a disc drive to reduce vibration.

As suggested in U.S. Pat. No. 5,965,249, however, dampers used for reducing suspension head resonance are conventionally affixed separately on a surface (e.g., top surface) of the suspension load beam, typically using an adhesive, instead of being formed as an integral part of the suspension load beam. This is in line with the conventional concept of suspension damping in which the stainless steel part of the beam is considered the base structure to provide stiffness and mechanical integrity, while an add-on damper is considered to provide damping only. To achieve this goal, much effort has been made to provide a damper that does not cause significant structural mortification of the base structure.

In order to maximize the shear energy absorption in the damping material, elaborate designs of using a constraining member have been proposed. For example, U.S. Pat. No. 5,594,607 to Erpelding et al. discloses a laminated suspension having a stainless steel stiffener layer, a top constraining layer (which also functions as a conductor layer), and a viscoelastic dielectric damping layer, wherein the constraining layer has a pattern of land areas etched thereon to increase the shear energy absorption in the damping layer.

Using a different approach, U.S. Pat. No. 5,187,625 to Blaeser et al. proposes a head suspension load beam which incorporates a layer of damping material throughout the entire structure of the suspension to reduce the amplitude of all resonant modes of vibration. It is believed that because the point on the suspension structure at which maximum strain energy occurs may change for each mode of vibration, it is advantageous to distribute the damper throughout the entire structure in order to cover all possible vibration modes. However, the use of the damping material layer throughout the entire suspension structure is still in line with the conventional concept of suspension damping in which the base structure of stainless steel provides stiffness and mechanical integrity while the add-on damper provides damping.

In yet another different approach, alloys having high intrinsic damping properties have been proposed to replace the conventional stainless steel to make suspension load beams in a disc drive. An example of such alloys is found in U.S. Pat. No. 6,361,740.

At the same time, with the increasing demand for disc drives that are more reliable, quieter and faster, and have larger storage capacity (with increased areal density) and sometimes smaller overall disc size, there is an increasing need for a disc drive suspension system having better balanced optimization between several performance properties including damping property, stiffness and the structural integrity.

SUMMARY

The present invention is a suspension load beam used for attachment to a slider assembly and an actuation arm in a disc drive for data storage. The suspension load beam has a front beam section connecting to a slider assembly carrying a transducer head, a rear beam section connecting to an actuation arm, and a rigid middle beam section located between the front beam section and the rear beam section. The rigid middle beam section comprises a rigid bottom layer, a rigid top layer and a composite core layer sandwiched between the bottom layer and the top layer. The composite core layer comprises a damping material and a rigid material and is coextensive with the rigid bottom layer. In one embodiment, the composite core layer is a multilayer laminate structure having a layer of the damping material and a layer of the rigid material, the two layers being coextensively laminated together.

The present invention is also a method for fabricating a vibration resistant mechanical member used a disc drive subject to high frequency motion operations. The method comprises the following steps: providing a first rigid layer; laminating a composite core layer on the first rigid layer, wherein the composite core layer comprises a damping material and a rigid material; laminating a second rigid layer on the core layer so that the composite core layer is sandwiched between the first rigid layer and the second rigid layer to form an integral laminate structure; and fabricating the mechanical member from the integral laminate structure, so that the mechanical member has a desired size and shape for each individual layer of the integral laminate structure. In one embodiment of the method, the composite core layer is a multilayer laminate structure having a layer of the damping material and a layer of the rigid material, the two layers being coextensively laminated together.

The invention utilizes a realization that, instead of addressing the stiffness and mechanical integrity of the suspension load beam and its damping property separately by adding dampers to the main structure of the suspension load beam, a composite material having both a structural element and a damping element is used to form the core of the suspension load beam to achieve balance and optimization in both above respects at the same time.

BRIEF DESCRIPTION OF THE DRAWINGS

The present invention will be further explained with reference to the drawing figures listed below, wherein like structure is referred to by like numerals throughout the several views.

FIG. 2 is a schematic view of a suspension load beam in accordance with the present invention.

FIG. 3 is a cross-sectional view of FIG. 2 along section 3-3.

FIG. 6 is a schematic view of a variation of the suspension load beam in FIG. 2.

FIG. 7 is a schematic view of a second variation of the suspension load beam in FIG. 2.

DETAILED DESCRIPTION

Figure 1:
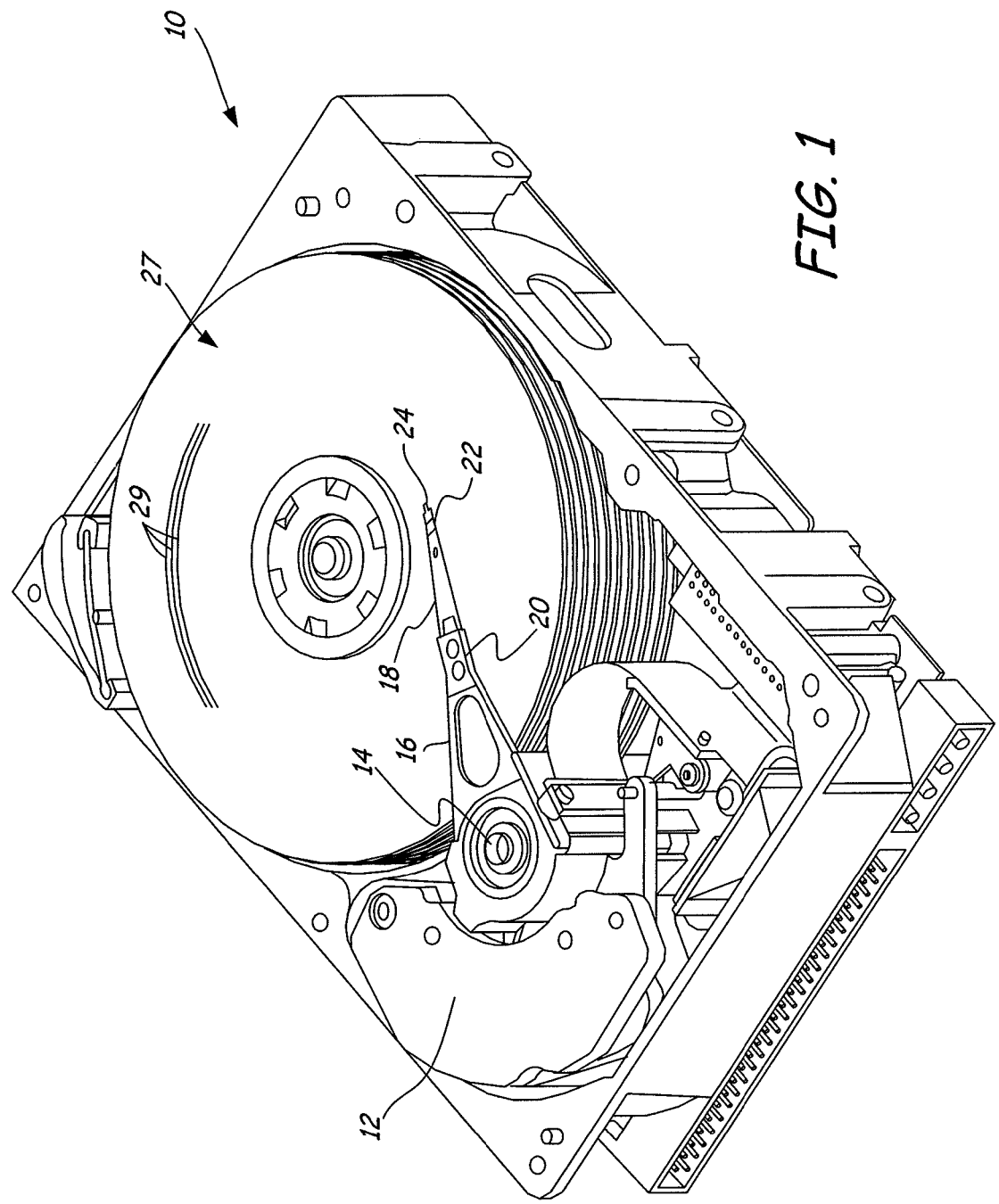
FIG. 1 is a perspective view of a disc drive including an actuation system for positioning a slider over tracks of a disc.

FIG. 1 is a perspective view of a prior art disc drive 10 which includes voice coil motor (VCM) 12 arranged to rotate actuator arm 16 on spindle around axis 14. Head suspension load beam 18 is connected to actuator arm 16 at head mounting block 20. Flexure 22 is connected to a distal end of head suspension load beam 18, and carries slider 24. Slider 24 carries a transducing head (not shown in FIG. 1) for reading and/or writing data on disc 27, which rotates around axis 28 and includes concentric tracks 29 on which the data is written.

FIG. 2 shows more details of an embodiment of suspension load beam 18 in accordance with the present invention. Suspension load beam 18 has front beam section 30 spanning longitudinally the range denoted by "a", middle beam section 32 spanning longitudinally the range denoted by "b", and reader beam section 34 spanning longitudinally the range denoted by "c". In this description, the longitudinal direction is along the conventional length of the suspension load beam. On middle beam section 32 are a pair of side rails 35 to further stiffen that section. On rear beam section 34 is mounting hole 36 for attaching suspension load beam 18 to actuator arm 16 (FIG. 1) and the mounting block 20 (FIG. 1). The attaching mechanism, commonly a swaging mechanism as known in the art, is not essential to the present invention. On front beam section 30 is matching registration opening 38 for mounting slider 24 (FIG. 1), commonly using a flexure and gimbal mechanism as known in the art. The mechanism for mounting slider 24 on suspension load beam 18 is not essential to the present invention. Furthermore, structural appearance of suspension load beam 18 in FIG. 2, such as matching registration opening 38, side rails 35 and mounting hole 36 are nonessential for the present invention.

FIG. 3 is a sectional view of FIG. 2 along section 3-3. As shown in FIG. 3, middle beam section 32 has three layers. Bottom layer 40 is a rigid support layer made of stainless steel having a nominal thickness of about 1 mil (0.001 in., or 0.0254 mm). Top layer 42 is another rigid support layer similar to bottom layer 40, made of stainless steel having a nominal thickness of about 1 mil (0.001 in., or 0.0254 mm). Sandwiched in the middle of bottom layer 40 and top layer 42 is composite core layer 44 having a nominal total thickness of about 4 mils (0.004 in., or 0.102 mm). The three layers, 40, 42 and 44, are laminated together to form a sheet structure constituting middle beam section 32.

Figure 4:
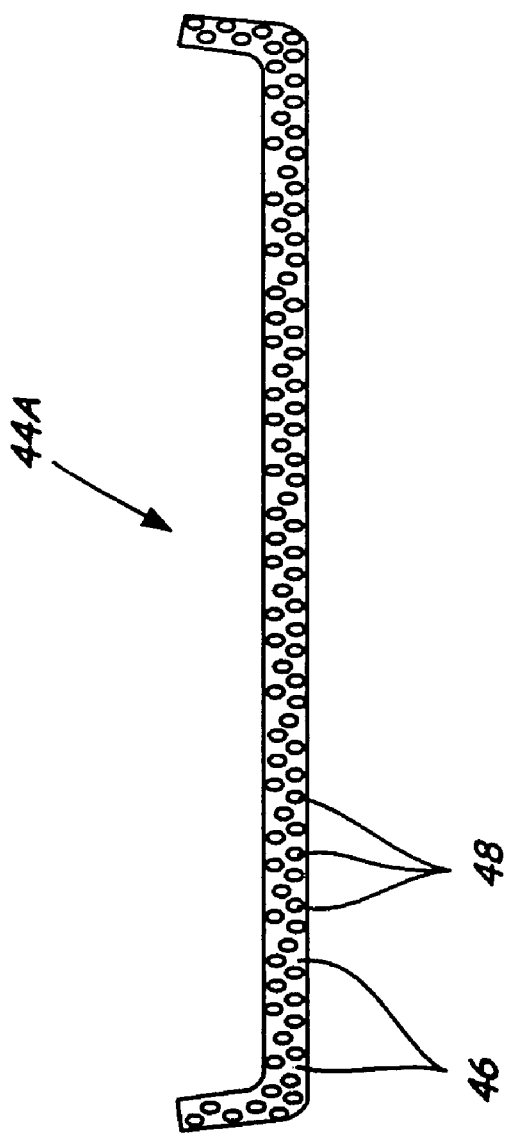
FIG. 4 is an enlarged view of an embodiment of the composite core layer in FIG. 3 in accordance with the present invention.
Figure 5:
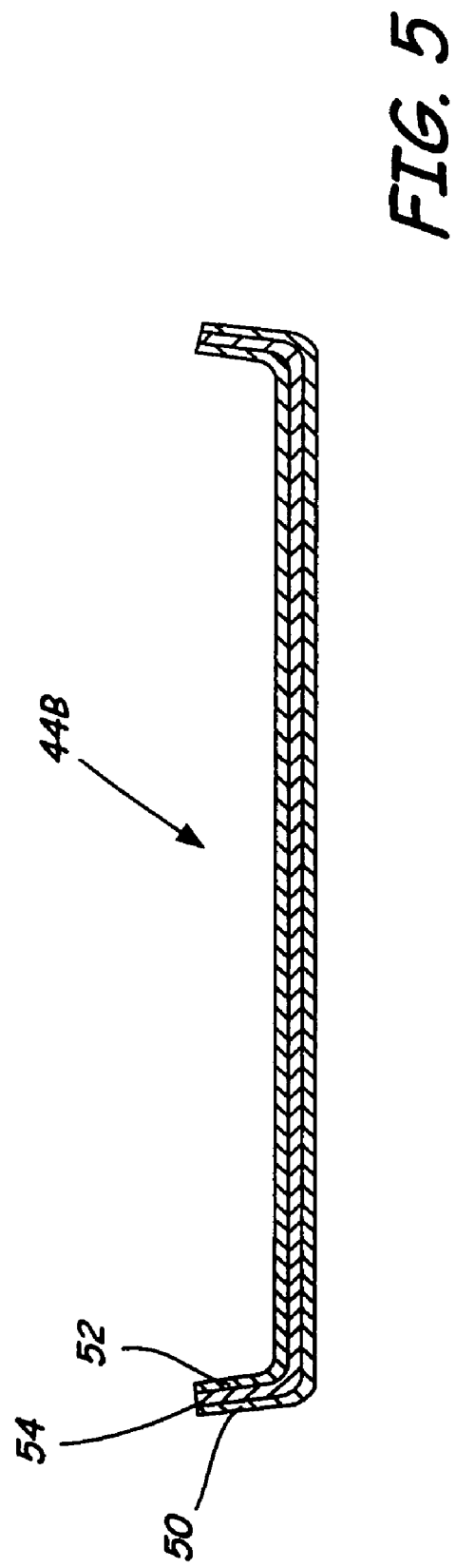
FIG. 5 is an enlarged view of a second embodiment of the composite core layer in FIG. 3 in accordance with the present invention.

FIG. 4 and FIG. 5 show further details, in two different embodiments 44A and 44B, of composite core layer 44 in FIG. 3. As distinguished from prior art structures in use or disclosed, the core layer 44 is made of a composite material having at least two different materials (phases) instead of a damping material only. In a two-phase combination, the first phase material is a rigid material such as resin, epoxy, polyolefin, polyurethane, polyethylene or polyamide in solid or glass state. This phase is to contribute to the structural stability of suspension load beam 18 by virtue of its stiffness. The second phase material is a damping material that demonstrates a desirable damping property. Any damping material, as long as it can form a stable composite with the first phase material may be used. As it has been known in the art, materials that exhibit a large ratio of dynamic loss moduli to dynamic storage moduli, tan $\delta$, tend to have high shear energy absorption and thus are good candidates for making dampers. An exemplary type of materials exhibit a large tan $\delta$ is viscoelastic materials. These materials, when deformed, have a stress proportional to both the deformation and the rate of deformation. An example of a suitable viscoelastic material is the family of Scotchdamp brand SJ2015X, such as ISD 110 as identified by the manufacturer, available from 3M Corp. in St. Paul, Minn. Many other materials, particularly polymers such as polyamide, epoxies, silicones, polyurethanes, fluorocarbons waxes, acrylics, demonstrate damping properties. In general, a polymer that is near or above its glass transition temperature may be used for the second phase material in composite core layer 44 in accordance with the present invention.

There are many ways to form a composite of two or more phases. As known in the art of making composites, two-phase composites can be combined in 10 unique configurations. Among these unique configurations, the 0-3 and 2-2 configurations are the most common. In the 0-3 configuration, as reflected by the name of this configuration in which each digit indicates the number of dimensions a corresponding phase is connected to itself, the first phase material is connected in three (3) dimensions with itself and the second phase material is not connected in any dimension (i.e., zero dimension) with itself. In the 2-2 configuration, the first phase material and the second phase material are each connected in two dimensions with itself.

FIG. 4 is an enlarged view of composite core layer 44 in FIG. 3 having 0-3 configuration in accordance with the present invention. The composite core layer having this specific configuration is denoted as 44A. In this embodiment, the first phase material is denoted as 46 while the second phase material is denoted as 48. The first phase material 46 comprises a continuous rigid material, and the second phase material 48 comprises discrete particles of the damping material dispersed in the first phase material. An example of this 0-3 composite configuration has a porous material such as polymer, foam, fabric or metal as the first phase material with particles of the second phase material, a viscoelastic damping material, entrapped in the pores of the first phase material.

FIG. 5 is an enlarged view of composite core layer 44 in FIG. 3 having 2-2 configuration in accordance with the present invention. The composite core layer having this specific configuration is denoted as 44B. In the embodiment illustrated, composite core layer 44B has a laminated composite structure in which a rigid material (first phase material) layer 54 has a nominal thickness of about 3 mils (0.003 in., or 0.0762 mm) is sandwiched between two much thinner damping material (second phase material) layers 50 and 52 each having a nominal thickness of about 0.5 mil (0.0005 in. or 0.0127 mm).

Although the 2-2 composite configuration shown in FIG. 5 has two damping material layers 50 and 52 separated by rigid material layer 54, the simplest possible 2-2 composite configuration may require only one damping material layer and one rigid material layer only, omitting one of damping material layers 50 and 52. Alternatively, multiple rigid material layers and multiple damping material layers may be laminated together in a sequence alternating between the two material phases (rigid material and damping material).

Suspension load beam 18 of FIG. 2 having middle beam section 32 that has composite core layer 44 sandwiched between two rigid top and bottom layers 42 and 40 can be made by a number of possible methods, primarily lamination methods. Composite core layer 44, two embodiments of which (44A and 44B) are illustrated with more details in FIG. 3 and FIG. 5, may be separately formed first and then applied on bottom layer 40, followed by the application of top layer 42 on composite core layer 44. The lamination of two contacting layers (bottom layer 40 and composite core layer 44, or top layer 42 and composite core layer 44) may be realized by a number of ways, including heating, mechanical means such as pressure or binders, or through an adhesive. When an adhesive is used, a separate adhesive layer (not shown) may be used between the two contacting layers. Alternatively, in the embodiment having a laminated multiple layer composite core 44B shown in FIG. 5, one or both damping material layers 50 and 52 may also be an adhesive at the same time, facilitating direct binding to their contacting layer (bottom layer 40 and top layer 42, respectively) without requiring additional adhesive layers.

The embodiment having a laminated multiple layer composite core 44B shown in FIG. 5 may be alternatively made by sequentially laminating all layers (40, 50, 54, 52 and 42) starting from bottom layer 40, instead of forming composite core 44 first and subsequently laminating composite core 44B on bottom layer 40.

Although suspension load beam 18 may be fabricated individually, it can also be made in batch form. To do this, lamination of a size much larger than that of an individual suspension load beam is made first and then cut into smaller pieces for individual suspension load beams. Further features such as side rails 35 (FIG. 2) can then be formed an individual suspension load beams. A number of cutting methods known in the art, including etching, ion milling and direct slicing using a blade, may be used.

As shown in FIG. 3, damping material layer 44 and rigid bottom layer 40 are coextensive in the lateral direction of cross-section line 39 (FIG. 2). Damping material layer 44 and rigid bottom layer 40 may also be coextensive in the longitudinal direction along the length of load beam 18 in the range devoted by "b" in FIG. 2. Coextensiveness between these two layers in either direction is not required by the present invention, but may be preferred due to manufacturing reasons. Because the present invention allows control of the thickness of each layers, such as the overall thickness of composite core layer 44 and individual thicknesses of damping material layers 50 and 52 and rigid material layer 54 (FIG. 5), there is no requirement to control or adjust the area of these layers in order to achieve an optimized balance among mass, rigidity and damping effect. In contrast, in prior art damping methods in which a damper is attached to a surface of the suspension load beam, controlling of the location, overall amount, and the size of the area over which the damper covers is always a source of difficulties in manufacturing and a cause of inconsistency.

Furthermore, although the above-described coextensiveness between different layers may be preferred during the process of lamination, the areas of each layer may be individually modified after lamination process is complete using methods such as etching commonly known in the art. Particularly, instead of using stainless steel top layer 42, a different rigid material such as a conductive material may be used as top layer 42 for a purpose other than structural reinforcement of the load beam. Etching subsequent to lamination on the top layer may be necessary, and possible in the method of the present invention, in order to form patterns required for functions unique to the top layer. One of the advantages of using a composite core layer which has both a damping component and a rigid structural component according to the present invention is the ability to reduce the degree of reliance on structural reinforcement contributed by components such as stainless steel. It is therefore possible that a stainless steel bottom layer together with the composite core layer together may have sufficient mass-stiffness-damping performance, leaving room for selecting a top layer to provide other functionalities without being severely constrained by mass-stiffness-damping performance of the load beam.

The composite core in accordance with the present invention may be used in combination of any other designs for suspension load beams. For example, the composite core may be used in suspension load beams disclosed in U.S. Pat. No. 6,157,522 to Murphy et al. and U.S. Pat. No. 6,392,843 to Murphy, which two patents are incorporated herein by reference.

Denotation and separate description of the three beam sections 30, 32 and 34 in FIG. 2 is for the purpose of clarity of description only and does not suggest that the three sections have to be fabricated separately and then assembled together. Rather, the entire suspension load beam 18 may be fabricated as a single integral piece. For example, the three beam sections 30, 32 and 34 may share the same stainless steel bottom layer 40, making the three beam sections not only integral but also partially unitary with respect to the shared stainless steel bottom layer 40. In another embodiment, front beam section 30 has a rigid front bottom layer, a rigid front top layer and a composite front core layer sandwiched between the front bottom layer and the front top layer. Front beam section 30 and middle beam section 32 can be then unitary with respect to all three layers. That is, front beam section and middle beam section 32 may share a unitary rigid bottom layer, the unitary rigid top layer and the unitary composite core layer, respectively.

In addition, although dimensions such as lengths in the longitudinal direction of the three beam sections, and comparative dimensions such as ratios lengths thereof are design choices that affect the overall performance of the mass-spring-damping system, the suspension load beam according to the present invention is not limited to any specific dimensions are comparative dimensions and may be used in combination of any additional design considerations.

Although FIG. 2 shows that only middle beam section 32 has side rails 35, the feature of side rails are not essential for the present invention. Conventionally, side rails are formed on a section of load beam by bending an originally flat sheet (including the stainless steel sheet) in order to further stiffen that section. As shown in FIG. 2, side rails 35 are advantageously, but not necessarily, used to further stiffen middle beam section 32. Furthermore, the existence and the location of side rails 35 are not to be used as identification for middle beam section 32. As shown in FIG. 6, both front beam section 30a, which has matching hole 38a, and middle beam section 32 may have side rails, or even unitarily share the same pair of side rails 35a as shown.

Furthermore, although as shown in FIG. 2 front beam section 30 has matching hole 38 connecting to the slider assembly of the disc drive, the location of the matching hole 38 and connection thereby to the slider assembly are not an identification for front beam section 30. As shown in FIG. 7, part of middle beam section 32 may also be used to connect to the slider through matching registration opening 38a. The essence of the present invention, although described with regard to three separate sections on the suspension load beam, is not a sectional design of the suspension load beam, but rather the use of a composite core in a stiff portion of the suspension load beam to integrally achieve good damping property and mechanical integrity of the suspension load beam.

The thicknesses of the layers in the illustrated embodiments are only illustrative. One of the advantages of using a composite core layer in accordance with the present invention is the availability of more designing dimensions in which optimization may be made. Because the composite core has both a structural element and damping element, the conventional rigid layer is no longer the sole contributor to the stiffness and structural integrity of the load beam. As a result, more room of designing freedom is gained intensive the thickness of the rigid layer and the selection of the material for making the same. In contrast, the prior art method using a damping material as the core of the suspension load beam has no provision of a structural element for the stiffness and mechanical integrity in the damping material core. In fact, while the prior art method has no intention to contribute to the stiffness and other mechanical properties of the suspension load beam by adding a damping material core, undesirable effects of an opposite kind may be unavoidable, given that the suggested thickness (1 mil) of the damping material core is comparable to the thickness of the stainless steel layer and constitutes about one third of the entire thickness (3 mils) of the suspension load beam.

Compared to the prior art method using a damping material as the core of the suspension load beam, it is envisioned that much less amount of damping material is needed to achieve a comparable mass-stiffness-damping performance by using the composite core in accordance with the present invention. For example, in the embodiment shown in FIG. 5, nominal thickness of each damping material layer 50 and 52 may be significantly less than one fourth of the nominal thickness of rigid material layer 54. In one embodiment, it is envisioned that rigid bottom layer 40 and rigid top layer 42 each have a thickness of 1 mil inches (0.001 in. or 0.0254 mm) or less, composite core 44B (FIG. 5) has an overall nominal thickness of about 4 mil inches (0.004 in. or 0.102 mm) or less with a nominal thickness of about 3 mil inches (0.003 in. or 0.076 mm) for rigid material layer 54, while damping material layers 50 and 52 each have a much smaller nominal thickness of 0.5 mil inches (0.0005 in. 0.0127 mm) or less. Alternatively, one of damping material layers 50 and 52 may be replaced by a thin adhesive layer. For example, composite core 44B may have damping material layer 52 of a nominal thickness of about 1.0 mil inches (0.001 in. or 0.0254 mm), rigid material layer 54 of a nominal thickness of 3 mil inch (0.003 in. or 0.076 mm), and an adhesive layer of a nominal thickness of 0.2 mil inches (0.0002 in. or 0.0051 mm) in place of damping material layer 50. It should be understood that within the spirit of the present invention, numerous combinations, both in terms of the layer sequence and layer thicknesses, are available. Given a certain ratio of layer thicknesses, the overall thickness of the load beam may be reduced to much less than the exemplary 5 mil-6 mil inches if necessary. Furthermore, depending on the damping need and the damping characteristics of the damping material used, damping material layer(s) much thinner than that of the above examples may be used. Furthermore, when multiple damping material layers (such as layers 50 and 52 in FIG. 5) are used, these layers do not have to have the same or a similar thickness. For example, layer 50 in FIG. 5 may be a damping material layer having a nominal thickness of about 0.2 mil inches (0.0002 in. or 0.0051 mm) and layer 52 in FIG. 5 may be a damping material layer having a nominal thickness of about 1 mil inches (0.001 in. or 0.0254 mm). Either or both of these damping material layers may also act as an adhesive layer.

Another aspect of the present invention relates to the realization that damping is only necessary during the operation of the disc drive and that the operating temperature of the disc drive is usually above room temperature. The operating temperature of a typical have disc drive, for example, is 45-75° C. This particular range of operating temperature is a relative consideration in material selections of both first phase material (rigid material) and second phase material (damping material) to make the composite core layer for a suspension load beam in accordance with the present invention. For example, polymers such as polyimides may be used for both first phase and second phase materials, as long as the polymer for first phase material remains rigid in the temperature range of 45-75° C., or more narrowly 55-65° C., while the polymer for second phase material becomes viscoelastic in the same temperature range. Such selections of materials may be based upon the knowledge of the glass transition temperature of the polymer.

Although the present invention has been described with reference to preferred embodiments, workers skilled in the art will recognize that changes may be made in form and detail without departing from the spirit and scope of the invention.

The invention claimed is:

1. A method of manufacturing a suspension member for a disc drive, the method comprising:
    forming a laminate structure including a composite core layer sandwiched between a top layer and a bottom layer, wherein the composite core layer is formed of a polymeric rigid material with discrete polymeric viscoelastic damping material particles dispersed therein, wherein the composite core layer has a 0-3 composite configuration; and
    shaping the laminate structure to form the suspension member.

2. The method of claim 1, wherein shaping the laminate structure includes at least one cutting operation.

3. The method of claim 1, wherein shaping the laminate structure comprises:
    defining a front section for connecting to a slider assembly;
    defining a rear section for connecting to an actuation arm; and
    defining a middle section located between the front section and the rear section.

4. The method of claim 1, wherein the top and bottom layers comprise stainless steel sheet material.

5. The method of claim 1, wherein the composite core has a thickness of 5 mil inches (0.005 in. or 0.127 mm) or less.

6. The method of claim 1, wherein the damping material of the composite core has a glass transition temperature below 75° C.

7. A method of manufacturing a suspension member for a disc drive, the method comprising:

forming a laminate structure including a composite core layer sandwiched between a top layer and a bottom layer, wherein the top and bottom layers comprise stainless steel sheet material, wherein the composite core layer is formed of a rigid material with discrete viscoelastic damping material particles dispersed therein, wherein the composite core layer has a 0-3 composite configuration; and shaping the laminate structure to form the suspension member.

8. The method of claim 7, wherein shaping the laminate structure includes at least one cutting operation.

9. The method of claim 7, wherein shaping the laminate structure comprises:

defining a front section for connecting to a slider assembly;

defining a rear section for connecting to an actuation arm; and defining a middle section located between the front section and the rear section.

10. The method of claim 7, wherein the composite core has a thickness of 5 mil inches (0.005 in. or 0.127 mm) or less.

11. The method of claim 7, wherein the damping material of the composite core has a glass transition temperature below 75° C.

12. A method of manufacturing a suspension member for a disc drive, the method comprising:

forming a laminate structure including a composite core layer sandwiched between a top layer and a bottom layer, wherein the top and bottom layers comprise metal steel sheet material, wherein the composite core layer is formed of a rigid material and a viscoelastic damping material, wherein the viscoelastic damping material comprises discrete particles interspersed and embedded within the rigid material; and shaping the laminate structure by cutting to form the suspension member.

13. The method of claim 12, wherein the composite core layer has a 0-3 composite configuration.

14. The method of claim 12, wherein the damping material of the composite core has a glass transition temperature below 75° C.

* * * * *